United States Patent
Roundy et al.

(10) Patent No.: US 11,032,319 B1
(45) Date of Patent: Jun. 8, 2021

(54) SYSTEMS AND METHODS FOR PREPARING HONEYPOT COMPUTER FILES

(71) Applicant: Symantec Corporation, Mountain View, CA (US)

(72) Inventors: Kevin Roundy, Culver City, CA (US); Sandeep Bhatkar, Sunnyvale, CA (US); Michael Rinehart, San Jose, CA (US); Xiaolin Wang, San Jose, CA (US)

(73) Assignee: NortonLifeLock Inc., Tempe, AZ (US)

(*) Notice: Subject to any disclaimer, the term of this patent is extended or adjusted under 35 U.S.C. 154(b) by 272 days.

(21) Appl. No.: 16/119,168

(22) Filed: Aug. 31, 2018

(51) Int. Cl.
*H04L 29/06* (2006.01)
*G06F 21/62* (2013.01)
*G06F 21/55* (2013.01)
*G06N 20/00* (2019.01)
*G06F 16/951* (2019.01)

(52) U.S. Cl.
CPC ........ *H04L 63/1491* (2013.01); *G06F 21/554* (2013.01); *G06F 21/62* (2013.01); *G06N 20/00* (2019.01); *G06F 16/951* (2019.01)

(58) Field of Classification Search
CPC ......... G06F 21/6218; G06F 2221/2127; G06F 21/554; G06F 21/62; G06F 16/951; H04L 63/1416; H04L 63/1441; H04L 63/1491; G06N 20/00
See application file for complete search history.

(56) References Cited

U.S. PATENT DOCUMENTS

| | | | | |
|---|---|---|---|---|
| 7,117,532 B1* | 10/2006 | Lyle | ..................... | G06F 21/6218 726/23 |
| 7,904,958 B2* | 3/2011 | Lee | ......................... | H04L 51/12 709/206 |
| 8,549,643 B1* | 10/2013 | Shou | ..................... | G06F 21/556 726/23 |
| 9,912,695 B1* | 3/2018 | Chao | ..................... | H04L 63/1491 |
| 10,339,423 B1* | 7/2019 | Dinerstein | ........... | G06K 9/6256 |
| 2010/0077483 A1* | 3/2010 | Stolfo | ................. | H04L 63/1466 726/24 |
| 2017/0289191 A1* | 10/2017 | Thioux | ............... | H04L 63/1441 |

(Continued)

OTHER PUBLICATIONS

Ali, Tariq, "Using Machine Learning to Generate Human-Readable News Articles", accessed at at https://dev.to/tra/using-machine-learning-to-generate-human-readable-news-articles, accessed on Sep. 28, 2018, 25 pages.

(Continued)

*Primary Examiner* — Joseph P Hirl
*Assistant Examiner* — Chi D Nguy
(74) *Attorney, Agent, or Firm* — FisherBroyles, LLP

(57) ABSTRACT

The disclosed computer-implemented method for preparing honeypot computer files may include (1) identifying, at a computing device, a search term used by a cyber attacker in an electronic search request, (2) identifying, without regard to a search access restriction, a sensitive computer document in search results stemming from the electronic search request, (3) creating, as a security action in response to the electronic search request, a honeypot computer file based on the sensitive computer document and including the identified search term, and (4) placing the honeypot computer file in the search results. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2018/0077572 A1* | 3/2018 | Trappitt | ............. | G06Q 30/0267 |
| 2018/0357434 A1* | 12/2018 | Roy | ...................... | H04L 9/0643 |
| 2019/0005089 A1* | 1/2019 | Kempf | .................. | G06F 16/248 |
| 2019/0065745 A1* | 2/2019 | Araujo | .................... | G06F 21/57 |

OTHER PUBLICATIONS

Sankaran, Anush, "Workshop on Machine Learning for Creativity" at KDD 2017 / 23rd ACM SIGKDD Conference on Knowledge Discovery and Data Mining; Halifax, Nova Scotia—Canada, Aug. 13-17, 2017, accessed at https://creativeai.mybluemix.net/, accessed on Sep. 28, 2018, 7 pages.

* cited by examiner

SYSTEMS AND METHODS FOR PREPARING HONEYPOT COMPUTER FILES

BACKGROUND

Attempts at data theft by both malicious insiders and malicious attackers acting outside of organizations are ever-increasing in number. Despite the skill and tenacity of these attackers in their efforts, data theft takes time and resources. As a result, some organizations and security software may implement deception-based techniques to waste the time and resources of attackers, as well as to learn behaviors of attackers and to gather evidence of data theft-related crimes. Deception-based techniques also divert attackers' attention away from sensitive information and minimize the impact of attackers' efforts on legitimate company operations. However, it may be difficult to achieve the goals of deception-based techniques when a cyber attacker is a human and not an automated attacking tool. For example, a malicious insider may be undetected as a cyber attacker while performing permitted and repeated search actions within the cloud-based information repositories of an organization, such as BOX, DROPBOX, and GOOGLE DRIVE. In this example, the malicious insider may download sensitive documents in bulk and peruse the downloaded material at a later time.

SUMMARY

As will be described in greater detail below, the instant disclosure describes various systems and methods for preparing honeypot computer files in order to waste the time and resources of attackers, to identify and study their behavior, and/or to gather evidence of data theft-related crimes.

In some examples, a method for preparing honeypot computer files may include (1) identifying, at the computing device, a search term used by a cyber attacker in an electronic search request, (2) identifying, without regard to a search access restriction, a sensitive computer document in search results stemming from the electronic search request, (3) creating, as a security action in response to the electronic search request, a honeypot computer file based on the sensitive computer document and including the identified search term, and (4) placing the honeypot computer file in the search results.

In some examples, identifying the search term may further include receiving, via an application programming interface, search request information identifying the search term. In an example, identifying the search term may further include using cloud access security broker data to identify contents of application programming interface calls to cloud-based document repositories and responses thereto.

In some embodiments, the method may further include (1) identifying, as a security action in response to identifying the search term used by the cyber attacker, a potential security risk and (2) performing, in response to identifying the potential security risk, an additional security action in an attempt to ameliorate the potential security risk.

In an example, the creating the honeypot computer file may further include (1) identifying, prior to the electronic search request, the sensitive computer document as a candidate document for which the cyber attacker is likely to search and (2) creating the honeypot computer file from the candidate document. In some examples, the method may further include training a machine learning classifier model with prior search data describing sequences of search terms used by the cyber attacker, respective prior search results stemming from the prior search data, and files in the respective prior search results accessed by the cyber attacker. In an example, identifying the sensitive computer document as a candidate document may further include using the machine learning classifier model to identify the sensitive computer document as the candidate document. In some embodiments, the machine learning classifier model may be further trained to anticipate candidate search terms. In an example, creating the honeypot computer file may further include creating the honeypot computer file based on prior search terms used by the cyber attacker and the anticipated search terms of the cyber attacker. In some examples, the machine learning classifier model may be further trained to anticipate candidate search results. In an example, the method may further include (1) mapping the candidate search terms to the candidate search results and (2) identifying, with the mapping, the candidate document in the candidate search results.

In some embodiments, the honeypot computer file may include a link to at least one of another honeypot computer document, honeypot computer file, and honeypot computer account. In an example, the honeypot computer file may include a beacon.

In some examples, the method may further include at least one of (1) displaying the search results on a user display device and (2) sending the search results via a network device.

In an example, the method may further include leaking account credentials of an account to the cyber attacker to enable the electronic search request via the account. In some embodiments, the method may further include (1) identifying a compromised account and (2) enabling the electronic search request via the compromised account.

In one embodiment, a system for preparing honeypot computer files may include at least one physical processor and physical memory that includes computer-executable instructions that, when executed by the physical processor, cause the physical processor to (1) identify a search term used by a cyber attacker in an electronic search request, (2) identify, without regard to a search access restriction, a sensitive computer document in search results stemming from the electronic search request, (3) create, as a security action in response to the electronic search request, a honeypot computer file based on the sensitive computer document and including the identified search term, and (4) place the honeypot computer file in the search results.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify at the computing device, a search term used by a cyber attacker in an electronic search request, (2) identify, without regard to a search access restriction, a sensitive computer document in search results stemming from the electronic search request, (3) create, as a security action in response to the electronic search request, a honeypot computer file based on the sensitive computer document and including the identified search term, and (4) place the honeypot computer file in the search results.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
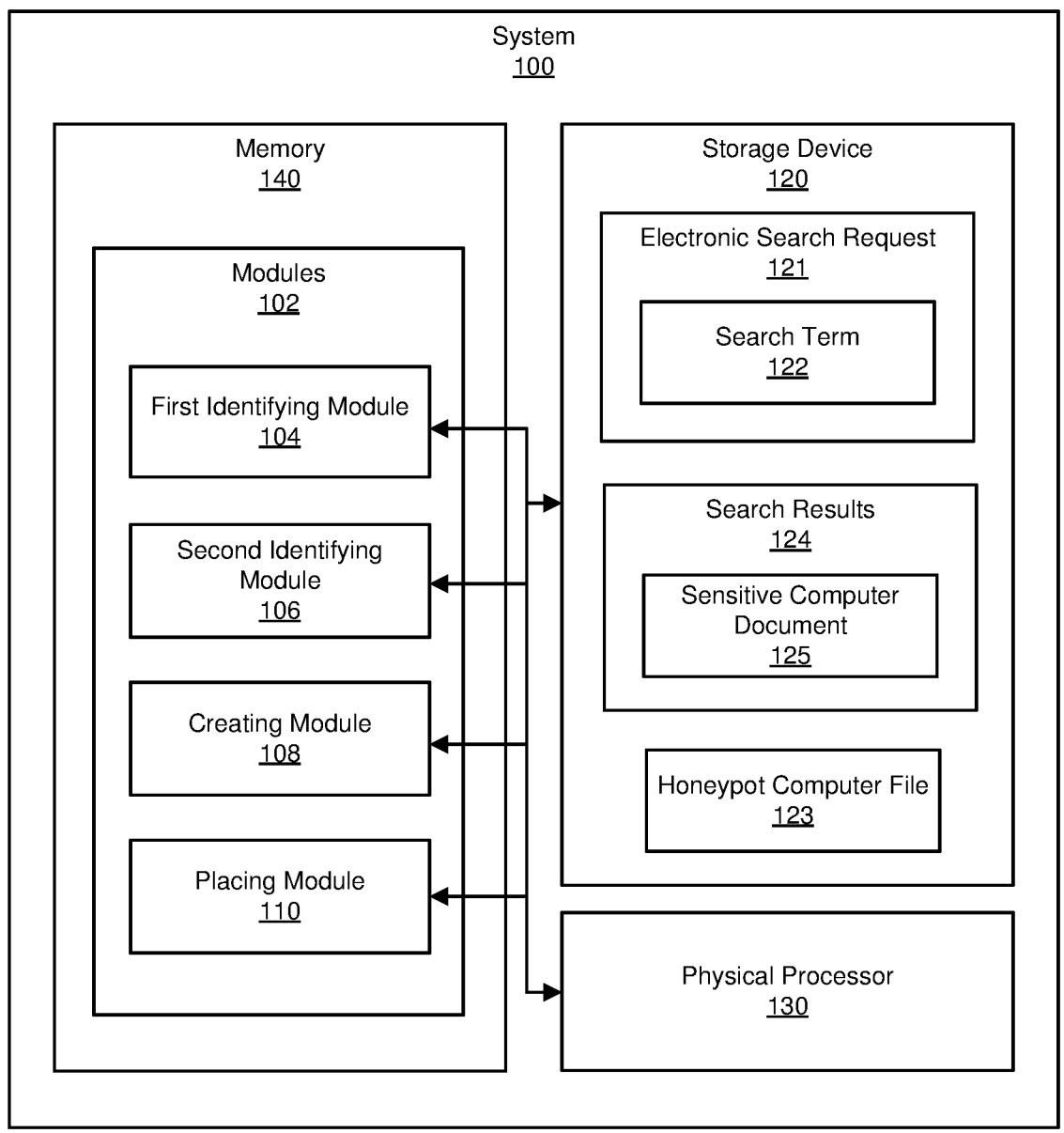
FIG. 1 is a block diagram of an example system for preparing honeypot computer files.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preparing honeypot computer files. As will be explained in greater detail herein, the disclosed systems and methods may automatically perform techniques that prevent, stop, and/or mitigate the effects of data exfiltration attempts, as well as enable the observation and study of attackers.

In some examples, the provided techniques may anticipate the nature of documents for which attackers are searching and replace genuine sensitive documents with honeypot computer files. Honeypot computer files may be fake documents, such as artificial counterparts to genuine sensitive documents. The provided techniques may also observe search requests by attackers (e.g., by monitoring application programming interface (API) calls and results) and create honeypot computer documents as a security action in response (e.g., on-the-fly) to the electronic search requests. The honeypot computer documents may include content that substantially matches the cyber attacker's search terms (e.g., "bitcoin," "private key," etc.). The honeypot computer documents may then be inserted into search results provided to the cyber attackers.

By doing so, the systems and methods described herein may improve the security of computing devices and/or provide targeted protection against data theft. Examples of computing devices in which the provided techniques may be implemented include, and are not limited to, laptop computers, tablet computers, desktop computers, wearable computing devices (e.g., smart watches, smart glasses), smartphone devices, identify verification devices, access control devices, and/or smart televisions. As such, the provided techniques may advantageously protect users by beneficially reducing security risks posed by attackers. Further, the systems and methods described herein may beneficially reduce occurrences of malicious acts by detecting human attackers such as malicious insiders. Also, the systems and methods described herein may beneficially enable the performance of anti-malware acts. The provided techniques may also make honeypot computer accounts more interesting by generating search results in the honeypot computer accounts based on material for which attackers are looking. Also, the systems and methods described herein may beneficially enable security software and/or administrators to observe attacker behavior, learn from attacker behavior, and/or improve anti-malware software based on observed attacker behavior.

Figure 2:
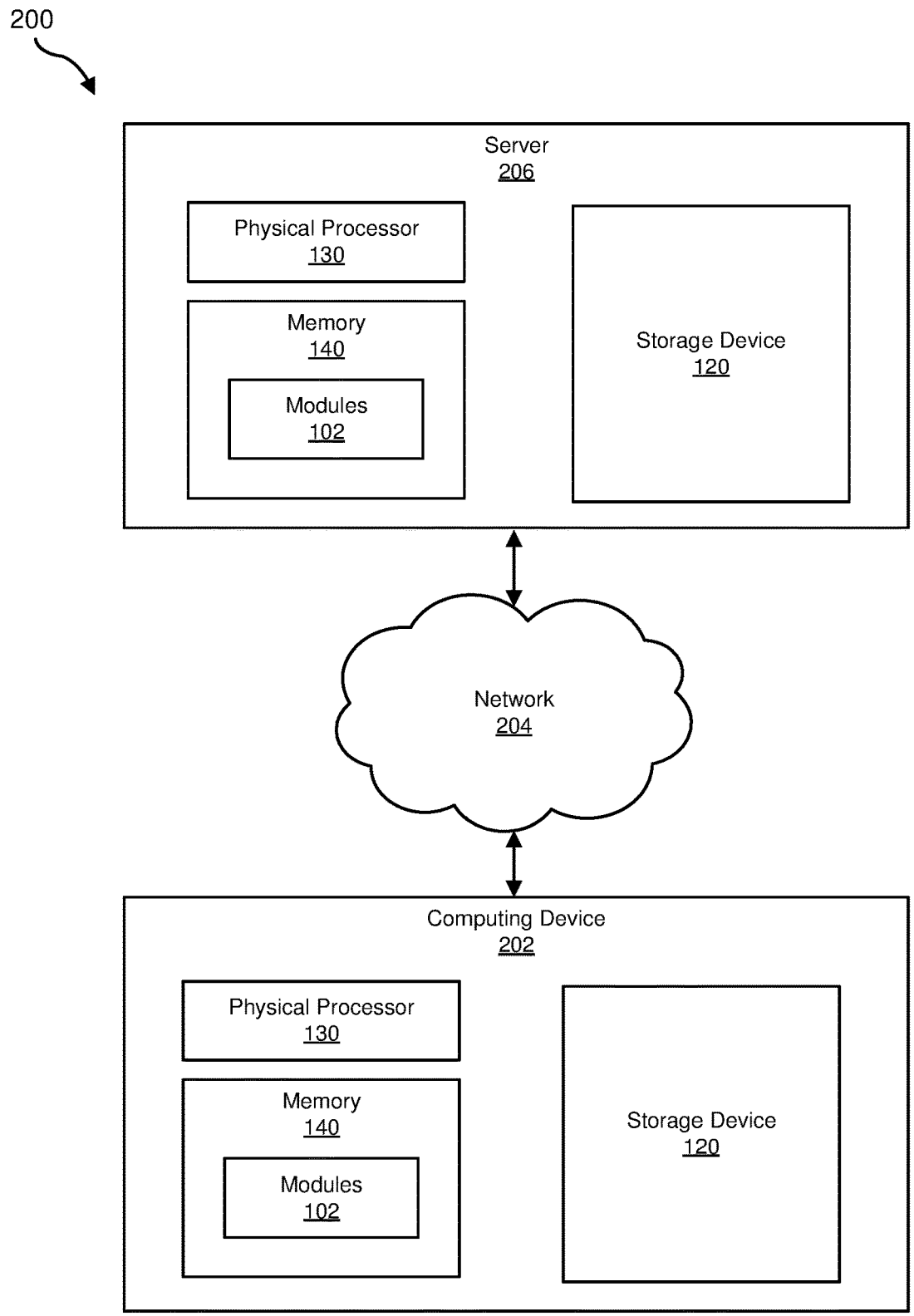
FIG. 2 is a block diagram of an additional example system for preparing honeypot computer files.
Figure 3:
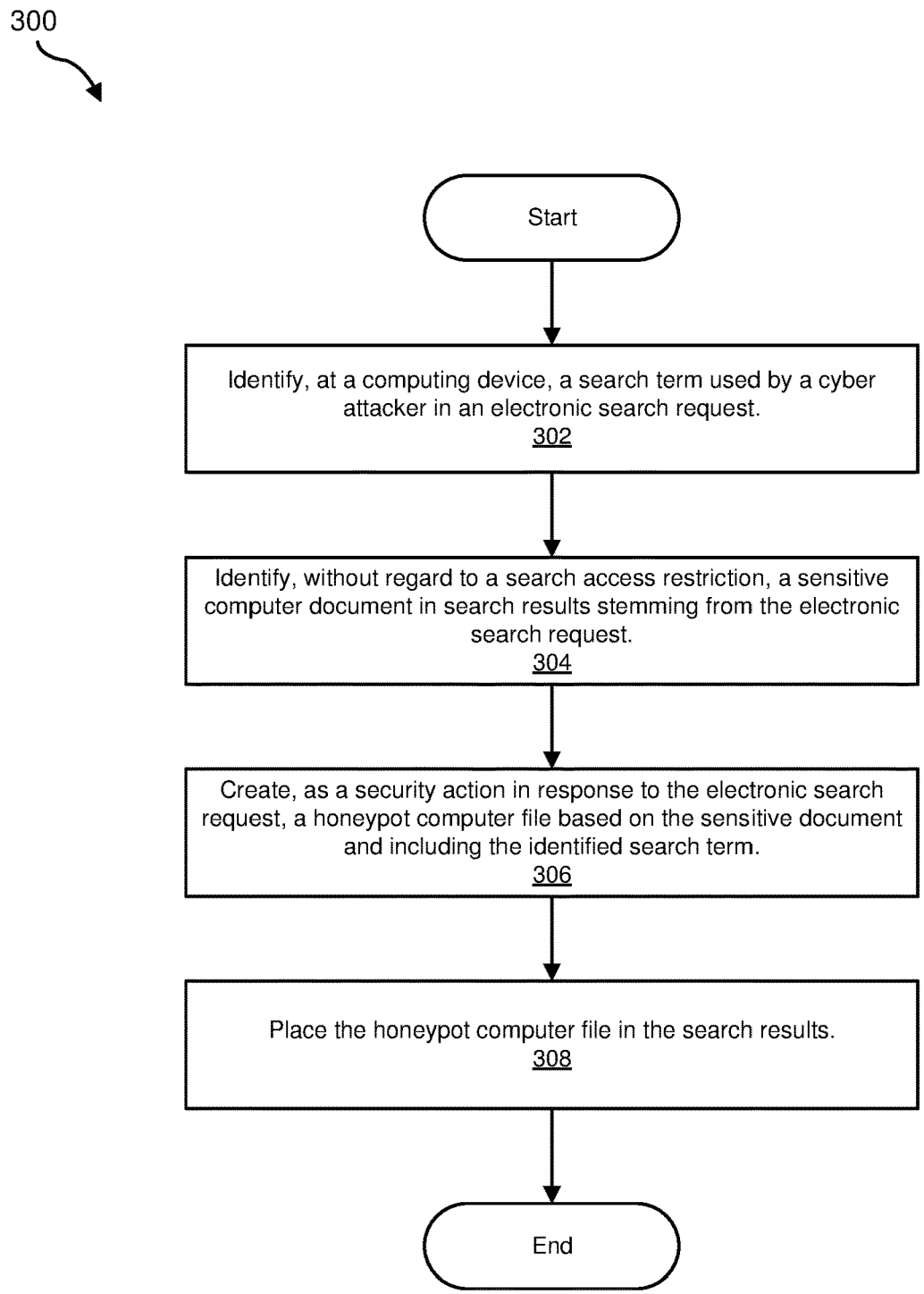
FIG. 3 is a flow diagram of an example method for preparing honeypot computer files.
Figure 4:
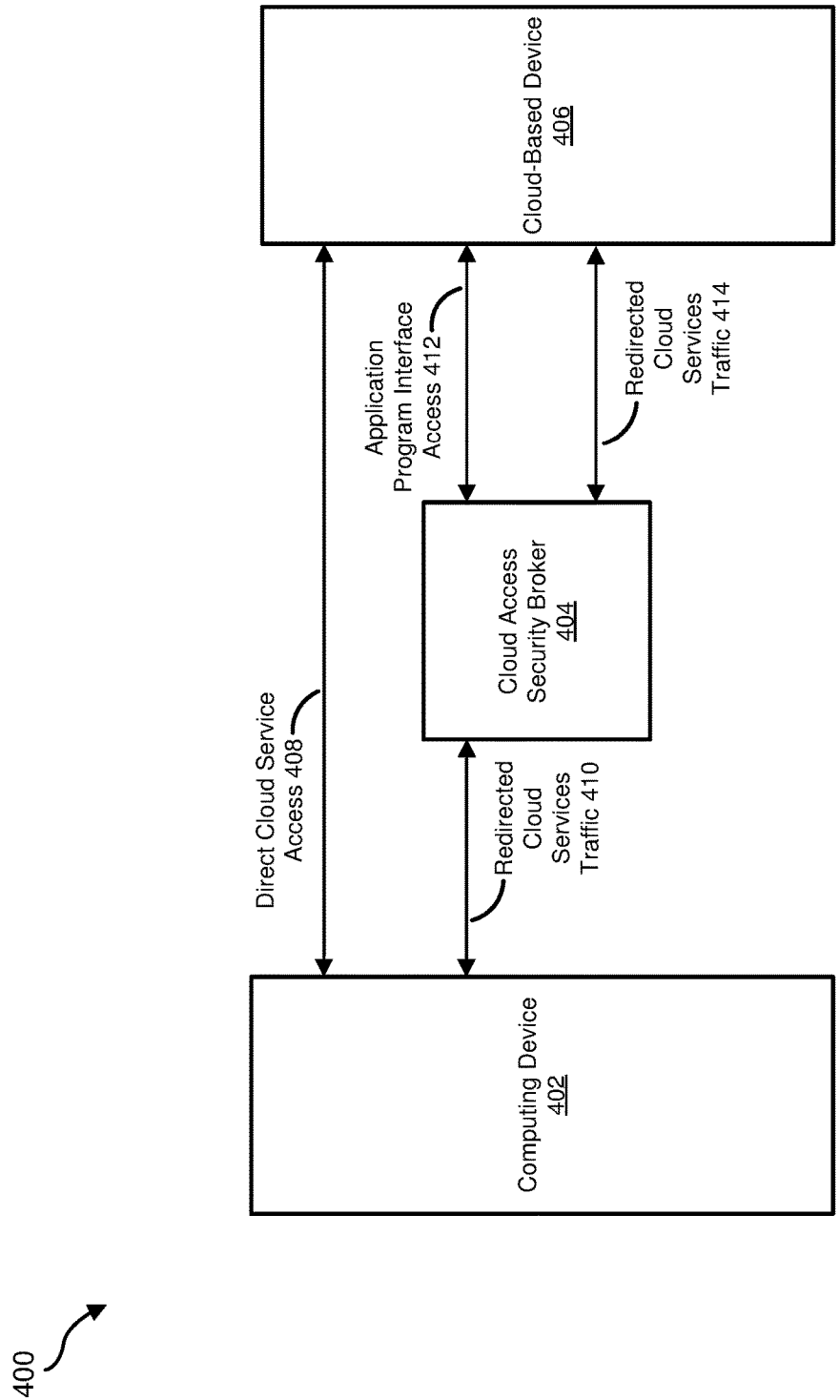
FIG. 4 is a block diagram of an example computing system capable of implementing one or more of the embodiments described and/or illustrated herein.

The following will provide, with reference to FIGS. 1-2 and 4, detailed descriptions of example systems for preparing honeypot computer files. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for preparing honeypot computer files. As illustrated in this figure, example system 100 may include one or more modules 102 for performing one or more tasks. As will be explained in greater detail below, modules 102 may include a first identifying module 104, a second identifying module 106, a creating module 108, and/or a placing module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In some examples, storage device 120 may store, load, and/or maintain information indicating one or more of an electronic search request 121, a search term 122, a honeypot computer file 123, search results 124, and/or a sensitive computer document 125. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. As used herein, in some examples, the terms "computer file" and "computer document" may be interchangeable.

As illustrated in FIG. 1, example system 100 may also include one or more honeypot computer files, such as honeypot computer file 123. Honeypot computer file 123 may generally represent any type or form of electronic information that may be provided to attract (e.g., act as bait), tempt, and/or deceive attackers who access the honeypot computer file. In some examples, without limitation, honeypot computer files may include text, data, information appearing to be personally identifiable identification (PII), information appearing to be company confidential information, information appearing to be classified information, information appearing to be employee-related employment information, and/or the like. In some examples, the access of honeypot computer files may be tracked to produce an audit trail.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In some examples, physical processor 130 may access and/or modify one or more of modules 102 stored in memory 140. Additionally or alternatively, physical processor 130 may execute one or more of modules 102 to facilitate preparing honeypot computer files. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In some examples, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In some examples, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to prepare a honeypot computer file. For example, and as will be described in greater detail below, one or more of modules 102 may cause computing device 202 and/or server 206 to (1) identify search term 122 used by a cyber attacker in electronic search request 121, (2) identify (e.g., without regard to a search access restriction) sensitive computer document 125 in search results 124 stemming from electronic search request 121, (3) create, as a security action in response to electronic search request 121, honeypot computer file 123 (e.g., based on sensitive computer document 125 and/or including identified search term 122), and (4) place honeypot computer file 123 in search results 124. In some examples, one or more of modules 102 may cause computing device 202 and/or server 206 to replace sensitive computer document 125 with honeypot computer file 123 in search results 124.

Computing device 202 generally represents any type or form of computing device capable of reading computer-executable instructions. In some examples, computing device 202 may represent a computer running security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device. In an example, computing device 202 may be at least a part of a computing device 402, a cloud access security broker 404, and/or a cloud-based device 406 in FIG. 4.

Returning to FIG. 2, network 204 generally represents any medium or architecture capable of facilitating communication or data transfer. In some examples, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that may be capable of reading computer-executable instructions. In some examples, server 206 may represent a computer running security software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. In an example, server 206 may be at least a part of computing device 402, cloud access security broker 404, and/or cloud-based device 406 in FIG. 4.

FIG. 3 is a flow diagram of an example computer-implemented method 300 for preparing honeypot computer files. The steps shown in FIG. 3 may be performed by any suitable computer-executable code and/or computing system, including system 100 in FIG. 1, system 200 in FIG. 2, and/or variations or combinations of one or more of the same. In some examples, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify search terms used by attackers in search requests. The systems described herein may perform step 302 in a variety of ways. For example, first identifying module 104 may, as part of computing device 202 in FIG. 2, server 206 in FIG. 2, computing device 402 in FIG. 4, cloud-based device 406 in FIG. 4, identify search term 122 used by a cyber attacker in electronic search request 121.

In some examples, identifying the search terms may further include receiving, via application programming interfaces (API), search request information identifying the search terms. In an example, identifying the search terms may further include using cloud access security broker (CASB) data to identify contents of API calls to cloud-based document repositories and responses thereto. Referring to FIG. 4, in some examples, identifying search term 122 may include using CASB data from CASB 406 to identify contents of API calls in API access 412 to cloud-based device 406 and responses thereto, such as documents that the cyber attacker opens, copies, and/or downloads.

Returning to FIG. 3, in some embodiments, the method may further include (1) identifying, in response to identifying the search terms used by the cyber attackers, potential security risks and (2) performing, in response to identifying the potential security risks, security actions in attempts to ameliorate the potential security risks. Security actions may include blocking attempts or limiting attempts in some manner, such as permitting reading a file but not permitting writing to the file. Example security actions may include blocking access to devices (e.g., storage devices, memories, network devices, etc.), allowing limited access to devices, allowing read-only access to devices, encrypting information, and/or other acts limiting access to devices. In some examples, security actions may be performed automatically. In some embodiments, security actions may be performed based on a level of sensitivity of information that attackers may attempt to transfer. In some examples, security actions may be performed according to a data loss prevention policy.

As illustrated in FIG. 3, at step 304 one or more of the systems described herein may identify sensitive documents in search results stemming from the electronic search requests. The systems described herein may perform step 304 in a variety of ways. For example, second identifying module 106 may, as part of computing device 202 in FIG. 2, server 206 in FIG. 2, computing device 402 in FIG. 4, cloud-based device 406 in FIG. 4, identify sensitive computer document 125 in search results 124 stemming from electronic search request 121.

In some examples, sensitive documents may be identified without regard to search access restrictions. In other words, when cyber attackers request files to which the cyber attackers do not have authorization to access and thus would not normally receive in search results, one or more of the systems described herein may nevertheless identify sensitive documents stemming from electronic search requests of the cyber attackers.

In some examples, sensitive documents may be marked as such, in document contents, file contents, metadata, and/or the like. In some examples, files may be identified as sensitive and marked accordingly prior to performing step 304.

In some examples, one or more of the systems described herein may include non-sensitive files in search results to enhance the appearance of honeypot computer files being genuine.

As illustrated in FIG. 3, at step 306 one or more of the systems described herein may create, as a security action in response to the electronic search request, a honeypot computer file based on the sensitive computer document and including the identified search term. The systems described herein may perform step 306 in a variety of ways. For example, creating module 108 may, as part of computing device 202 in FIG. 2, server 206 in FIG. 2, computing device 402 in FIG. 4, cloud-based device 406 in FIG. 4, create, as a security action in response to electronic search request 121, honeypot computer file 123 based on sensitive computer document 125 and including search term 122. In some examples, creating honeypot computer files may be at least a part of defensive security actions specifically relating to security that are performed in response to identifying search terms used by cyber attackers in electronic search requests.

In some embodiments, creating the honeypot computer file may further include (1) identifying, prior to the electronic search requests, the sensitive computer documents as candidate documents for which the cyber attackers are likely to search and (2) creating the honeypot computer files from the candidate documents. This technique may speed the process by identifying candidate documents in advance of creating the honeypot computer file.

In some examples, machine learning techniques may be used to automatically create prose that conforms to search topics, search terms, candidate search terms, and/or the like. In further examples, honeypot computer documents may have titles and realistic sentences that include search terms.

Machine learning techniques may speed aspects of the process. Thus, in some examples, the method may further include training machine learning classifier models with prior search data describing sequences of search terms used by the cyber attackers, respective prior search results stemming from the prior search data, and files in the respective prior search results accessed by the cyber attackers. In some examples, identifying the sensitive computer documents as candidate documents may further include using the machine learning classifier models to identify the sensitive computer documents as the candidate documents. In some embodiments, the machine learning classifier models may be further trained to anticipate candidate search terms. Moreover, in an example, creating the honeypot computer files may further include creating the honeypot computer files based on prior search terms used by the cyber attackers and the anticipated search terms of the cyber attackers. In some examples, the machine learning classifier models may be further trained to anticipate candidate search results (i.e., which documents are likely to be accessed next). In an example, the method may further include (1) mapping the candidate search terms to the candidate search results and (2) identifying, with the mapping, the candidate document in the candidate search results.

In some examples, natural language processing techniques, such as Latent Dirichlet Allocations (LDA), may extract topics from search terms and from organizational document corpuses. These topics may outline co-occurring words and/or terms that tend to appear together in documents. The co-occurring words and/or terms may then be used as candidate search terms and mapped to documents in candidate search results.

In some embodiments, the honeypot computer files may include links to honeypot computer documents, honeypot computer files, and/or honeypot computer accounts. Including links may help screen attackers from legitimate users and may also lead the cyber attackers down paths that continue to waste time and resources. Further, including links may also enable building audit trails that include additional files, which may be useful as evidence of malicious intent. In some embodiments, the honeypot computer files may include credentials for accessing honeypot computer accounts and/or honeypot computer files to further entice attackers to generate evidence of malicious intent.

In an example, the honeypot computer files may include beacons. Including beacons may also enable building audit trails that may be useful as evidence of malicious intent.

As illustrated in FIG. 3, at step 308 one or more of the systems described herein may place the honeypot computer files in the search results. The systems described herein may perform step 308 in a variety of ways. For example, placing module 110 may, as part of computing device 202 in FIG. 2, server 206 in FIG. 2, computing device 402 in FIG. 4, cloud-based device 406 in FIG. 4, place honeypot computer file 123 in search results 124.

In some examples, one or more of the systems described herein may replace the sensitive computer document (e.g., sensitive computer document 125) with the honeypot computer file (e.g., honeypot computer file 123) in the search results. In some examples, one or more of the systems described herein may prevent sensitive computer files from being presented in search results.

In some examples, the method may further include displaying search results (e.g., with honeypot computer file 123 replacing sensitive computer document 125) on user display devices, such as a user display of a cyber attacker and/or a user display of an administrator. In some examples, the method may further include sending search results via network devices (e.g., to a storage device, a display device, and/or another computing device) to another computing device, such as a computing device associated with a cyber attacker and/or a computing device associated with an administrator.

In some embodiments, the method may further include leaking account credentials of accounts (e.g., accounts configured to access cloud-based information, honeypot computer accounts, fake accounts, etc.) to attackers to enable search requests via the accounts. In some embodiments, the method may further include identifying compromised accounts and enabling search requests via the compromised accounts.

In some examples, attacker behavior and telemetry relating to accessing honeypot computer files may be observed and used to improve anti-malware. Some behaviors that may be observed include identifying origins of attacks and identifying subject matter for which attackers are looking (trade secrets, banking information, etc.).

As detailed above, the steps outlined in method 300 in FIG. 3 may prevent, stop, and/or mitigate effects of data theft attempts. By doing so, the systems and methods described herein may protect users by beneficially reducing occurrences of data theft by providing honeypot computer files as a security action in response to search requests by attackers.

FIG. 4 is a block diagram of an example computing system 400 capable of implementing one or more of the embodiments described and/or illustrated herein. Computing system 400 may include computing device 402, cloud access security broker (CASB) 404, and cloud-based device 406. In some examples, cloud-based device 406 may provide services on behalf of BOX, DROPBOX, and/or GOOGLE DRIVE.

In an example, direct cloud service access 408 may not sufficiently enable and/or provide sufficient security when computing device 402 accesses resources on cloud-based device 406. CASB 404 may provide security-related services relating to accessing cloud-based resources by computing device 402 to enable and/or provide sufficient security. For example, CASB 404 may provide data security, data theft protection, compliance management, and/or anti-malware services on redirected cloud service traffic 410 and redirected cloud services traffic 414. In some embodiments, CASB 404 may use APIs to control access to cloud-based device 406 via application program interface (API) access 412.

In some examples, computing device 402 and/or CASB 404 may use CASB data from CASB 404 to identify a search term used by a cyber attacker in an electronic search request (e.g., as at least a part of step 302 in FIG. 3). In some examples, identifying the search term may further include receiving, via an API, search request information identifying the search term. In an example, identifying the search term may further include using CASB data to identify contents of API calls to cloud-based document repositories and responses thereto. For example, identifying search term 122 may include using CASB data from CASB 406 to identify contents of API calls in API access 412 to cloud-based device 406 and responses thereto.

Figure 5:
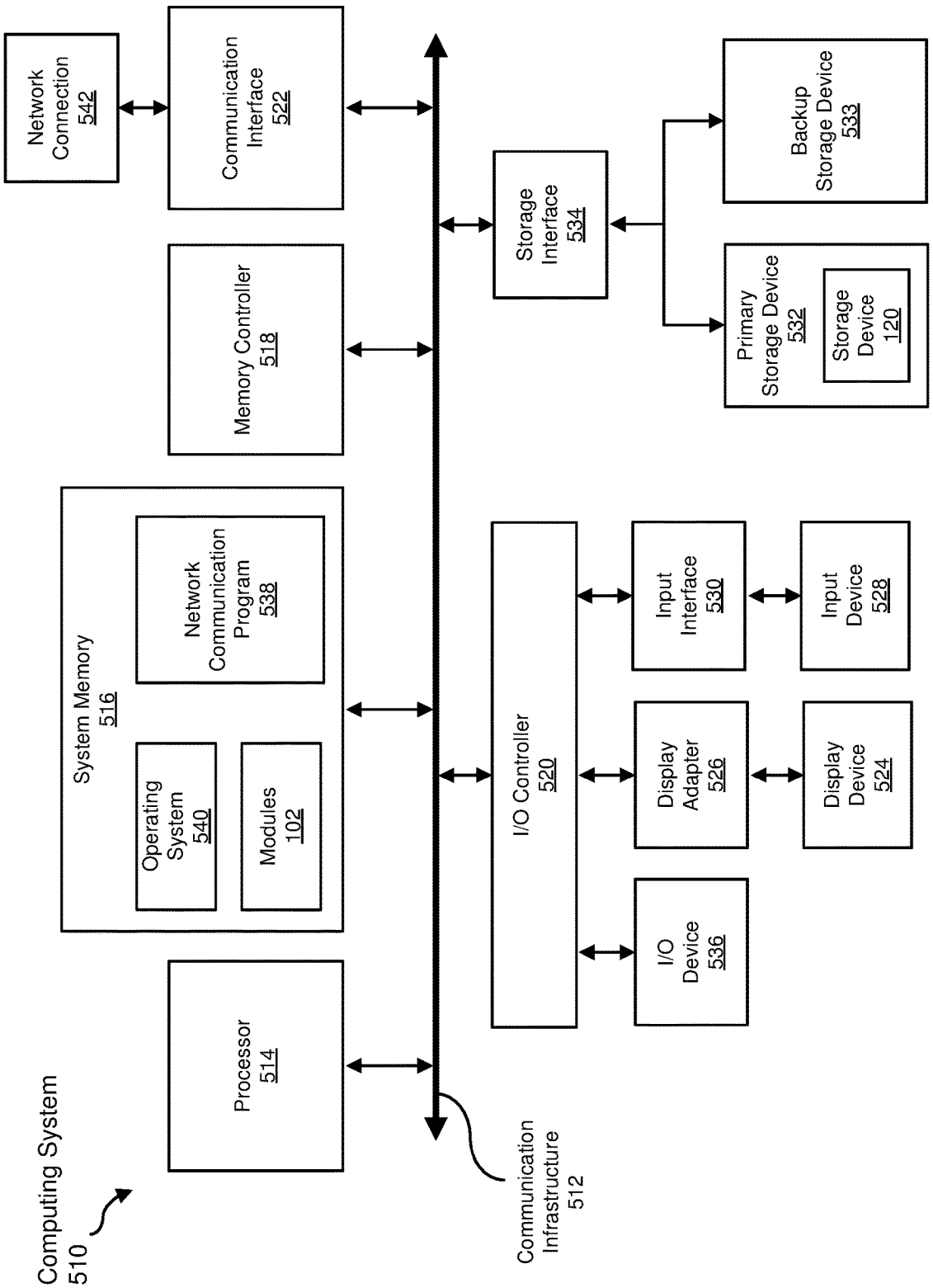
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In some examples, one or more of modules 102 from FIG. 1 may be loaded into system memory 516.

In some examples, system memory 516 may store and/or load an operating system 540 for execution by processor 514. In some examples, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In some examples, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In some examples, storage device 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
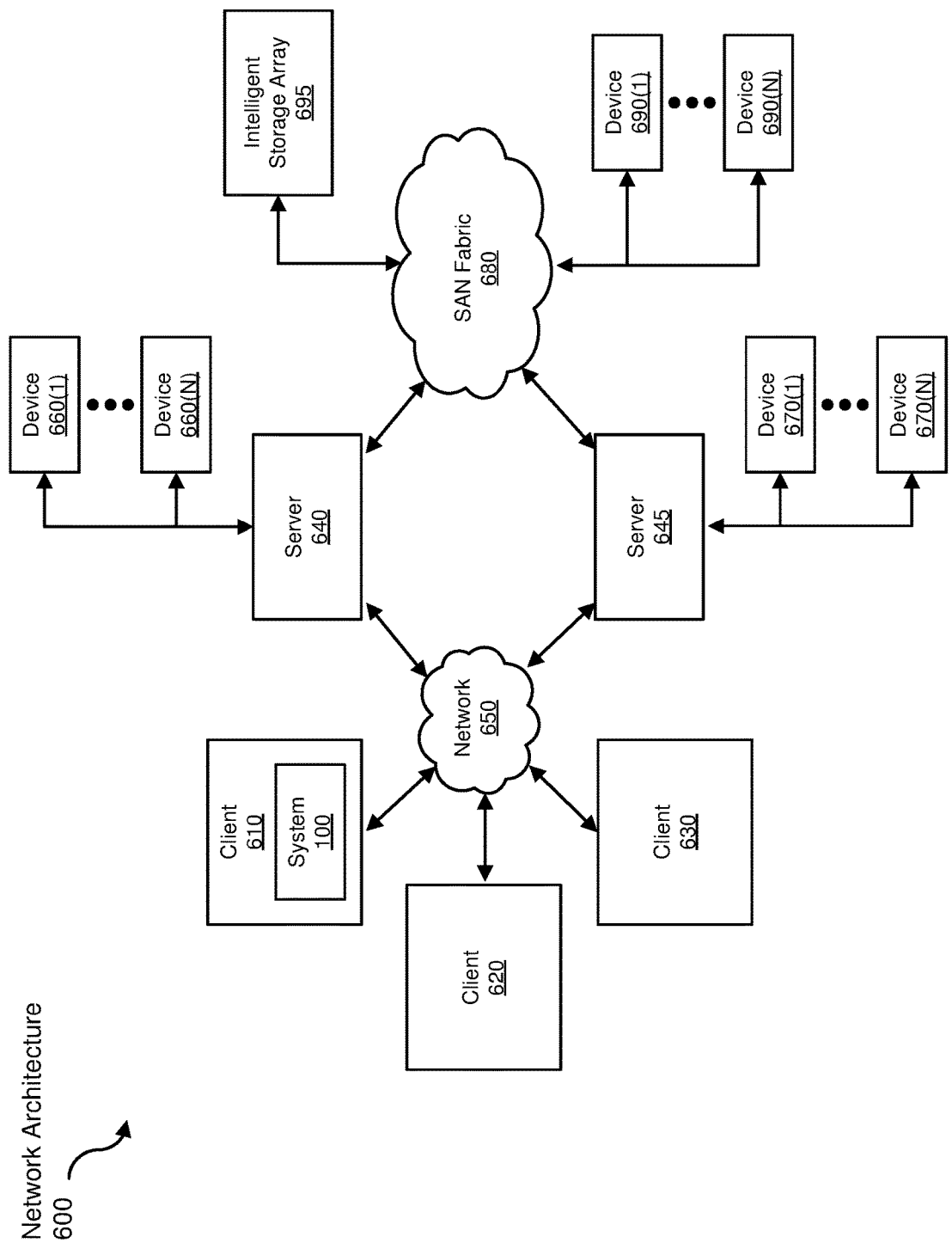
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In some examples, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for preparing honeypot computer files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a search term to be transformed, transform the search term, output a result of the transformation to a storage device, use the result of the transformation to create a honeypot computer document, and store the result of the transformation to a storage device and/or a user display device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preparing honeypot computer files to help prevent successful cyberattacks, at least a portion of the method being performed by a computing device comprising at least one processor, the method comprising:
    identifying, at the computing device, a search term used by a cyber attacker in an electronic search request;
    anticipating, using a machine learning classifier, one or more candidate search terms from the search term;
    extracting, using natural language processing, topics from document corpuses of sensitive documents;
    mapping, based on the extracted topics, the search term and the one or more candidate search terms to one or more candidate search results stemming from the electronic search request;
    identifying, without regard to a search access restriction, a sensitive computer document from the one or more candidate search results;
    creating, as a security action in response to the electronic search request, a honeypot computer file based on the sensitive computer document and comprising the identified search term; and
    placing the honeypot computer file in the search results.

2. The computer-implemented method of claim 1, further comprising:
    identifying, in response to identifying the search term used by the cyber attacker, a potential security risk; and
    performing, in response to identifying the potential security risk, an additional security action in an attempt to ameliorate the potential security risk.

3. The computer-implemented method of claim 1, wherein identifying the search term further comprises receiving, via an application programming interface, search request information identifying the search term.

4. The computer-implemented method of claim 1, wherein identifying the search term further comprises using cloud access security broker data to identify contents of application programming interface calls to cloud-based document repositories and responses thereto.

5. The computer-implemented method of claim 1, wherein creating the honeypot computer file further comprises:
    identifying, prior to the electronic search request, the sensitive computer document as a candidate document for which the cyber attacker is likely to search; and
    creating the honeypot computer file from the candidate document.

6. The computer-implemented method of claim 5, further comprising training the machine learning classifier model with prior search data describing sequences of search terms used by the cyber attacker, respective prior search results stemming from the prior search data, and files in the respective prior search results accessed by the cyber attacker.

7. The computer-implemented method of claim 6, wherein the identifying the sensitive computer document as a candidate document further comprises using the machine learning classifier model to identify the sensitive computer document as the candidate document.

8. The computer-implemented method of claim 6, wherein the machine learning classifier model is further trained to anticipate candidate search terms for a second electronic search request.

9. The computer-implemented method of claim 8, wherein creating the honeypot computer file further comprises creating the honeypot computer file based on prior search terms used by the cyber attacker and the anticipated candidate search terms for the second electronic search request of the cyber attacker.

10. The computer-implemented method of claim 8, wherein the machine learning classifier model is further trained to anticipate candidate search results corresponding to a document likely to be accessed after the sensitive computer document.

11. The computer-implemented method of claim 10, further comprising:
    mapping the anticipated candidate search terms for the second electronic search request to the anticipated candidate search results; and
    identifying, with the mapping, the candidate document in the candidate search results.

12. The computer-implemented method of claim 1, wherein the honeypot computer file comprises a link to at least one of another honeypot computer document, honeypot computer file, and honeypot computer account.

13. The computer-implemented method of claim 1, wherein the honeypot computer file comprises a beacon.

14. The computer-implemented method of claim 1, further comprising at least one of:
   displaying the search results on a user display device; and
   sending the search results via a network device.

15. The computer-implemented method of claim 1, further comprising leaking account credentials of an account to the cyber attacker to enable the electronic search request via the account.

16. The computer-implemented method of claim 1, further comprising:
   identifying a compromised account; and
   enabling the electronic search request via the compromised account.

17. A system for preparing honeypot computer files to help prevent successful cyberattacks, the system comprising:
   at least one physical processor; and
   physical memory comprising computer-executable instructions that, when executed by the physical processor, cause the physical processor to:
      identify a search term used by a cyber attacker in an electronic search request;
      anticipate, using a machine learning classifier, one or more candidate search terms from the search term;
      extract, using natural language processing, topics from document corpuses of sensitive documents;
      map, based on the extracted topics, the search term and the one or more candidate search terms to one or more candidate search results stemming from the electronic search request;
      identify, without regard to a search access restriction, a sensitive computer document from the one or more candidate search results;
      create, as a security action in response to the electronic search request, a honeypot computer file based on the sensitive computer document and comprising the identified search term; and
      place the honeypot computer file in the search results.

18. The system of claim 17, wherein creating the honeypot computer file further comprises:
   identifying, prior to the electronic search request, the sensitive computer document as a candidate document for which the cyber attacker is likely to search; and
   creating the honeypot computer file from the candidate document.

19. A non-transitory computer-readable medium comprising one or more computer-executable instructions that, when executed by at least one processor of a computing device, cause the computing device to:
   identify at the computing device, a search term used by a cyber attacker in an electronic search request;
   anticipate, using a machine learning classifier, one or more candidate search terms from the search term;
   extract, using natural language processing, topics from document corpuses of sensitive documents;
   map, based on the extracted topics, the search term and the one or more candidate search terms to one or more candidate search results stemming from the electronic search request;
   identify, without regard to a search access restriction, a sensitive computer document from the one or more candidate search results;
   create, as a security action in response to the electronic search request, a honeypot computer file based on the sensitive computer document and comprising the identified search term; and
   place the honeypot computer file in the search results.

20. The non-transitory computer-readable medium of claim 19, further comprising one or more computer-executable instructions that, when executed by the at least one processor of the computing device, cause the computing device to:
   identify, prior to the electronic search request, the sensitive computer document as a candidate document for which the cyber attacker is likely to search; and
   create the honeypot computer file from the candidate document.

* * * * *